United States Patent [19]

Shimizu et al.

[11] Patent Number: 4,558,612

[45] Date of Patent: Dec. 17, 1985

[54] VEHICULAR AUTOMATIC SPEED CHANGE GEAR ASSEMBLY

[75] Inventors: Takeo Shimizu; Takeo Hiramatsu; Bonnosuke Takamiya; Hiroshi Fukuchi, all of Kyoto, Japan

[73] Assignee: Mitsubishi Jidosha Kogyo Kabushiki Kaisha, Tokyo, Japan

[21] Appl. No.: 445,617

[22] Filed: Nov. 30, 1982

[30] Foreign Application Priority Data

Nov. 30, 1981 [JP] Japan .................. 56-192606
Nov. 30, 1981 [JP] Japan .................. 56-192607

[51] Int. Cl.⁴ .................. B60K 41/18; B60K 41/16
[52] U.S. Cl. .................. 74/844; 74/866; 74/869
[58] Field of Search ............. 74/850, 844, 852, 856, 74/866, 869, 867, 859, 752 A, 752 D; 364/424, 424.1; 192/3.58, 0.32, 0.09, 4 A

[56] References Cited

U.S. PATENT DOCUMENTS

| | | | |
|---|---|---|---|
| 2,529,076 | 11/1950 | Dubreuil | 192/4 A |
| 2,812,837 | 11/1957 | Khan | 192/4 A |
| 2,960,200 | 11/1960 | Strauss | 192/4 A |
| 2,970,679 | 2/1961 | Suller et al. | 192/4 A |
| 3,107,762 | 10/1963 | Snyder | 192/4 A |
| 3,119,477 | 1/1964 | Ryder | 192/4 A |
| 3,444,968 | 5/1969 | Golan | 192/4 A |
| 4,046,032 | 9/1977 | Braun et al. | 74/877 |
| 4,113,076 | 9/1978 | Lee et al. | 192/4 A |
| 4,194,608 | 3/1980 | Usui et al. | 192/3.58 |
| 4,262,335 | 4/1981 | Ahlen et al. | 74/866 |
| 4,271,728 | 6/1981 | Wakamatsu | 74/866 |
| 4,350,234 | 9/1982 | Suga et al. | 192/4 A |
| 4,355,698 | 10/1982 | Barnes et al. | 192/4 A |
| 4,373,619 | 2/1983 | Schritt et al. | 74/866 |
| 4,393,964 | 7/1983 | Kemper | 192/3.58 |
| 4,421,214 | 12/1983 | Sellmeyer | 192/4 A |
| 4,425,620 | 1/1984 | Batcheller et al. | 74/866 |

FOREIGN PATENT DOCUMENTS

3019274 11/1981 Fed. Rep. of Germany ........ 74/866
2117068 10/1983 United Kingdom .................. 74/866

Primary Examiner—Leslie A. Braun
Assistant Examiner—David Novais
Attorney, Agent, or Firm—Sughrue, Mion, Zinn, Macpeak & Seas

[57] ABSTRACT

A fully automatic transmission for use in automobiles requires the use of only a single manually operable switch in the vehicle compartment for selecting the travelling direction. All other functions of the transmission, namely the selection of the speed range, including neutral and the application of a parking mechanism are performed by a hydraulc control system in combination with an electronic control system operating according to a predetermined process.

11 Claims, 8 Drawing Figures

| SPEED CHANGES / FRICTIONAL ELEMENTS OF GEAR TRAIN | 1ST | 2ND | 3RD | 4TH | R | N,P |
|---|---|---|---|---|---|---|
| FRONT CLUTCH 24 | | | ○ | | ○ | |
| REAR CLUTCH 26 | ○ | ○ | ○ | | | |
| KICK DOWN BRAKE 30 | | ○ | | ○ | | |
| LOW REVERSE BRAKE 32 | ○ | | | | ○ | |
| ONE-WAY CLUTCH 34 | ⊘ | | | | | |
| 4TH SPEED CLUTCH 28 | | | | ○ | | |

FIG. 4

| SPEED CHANGES | SOLENOID VALVE 108 | SOLENOID VALVE 110 |
|---|---|---|
| 1ST | ON | ON |
| 2ND | OFF | ON |
| 3RD | OFF | OFF |
| 4TH | ON | OFF |

VEHICULAR AUTOMATIC SPEED CHANGE GEAR ASSEMBLY

BACKGROUND OF THE INVENTION

This invention relates to an improvement in vehicular automatic speed change gear assemblies.

A conventional automatic speed change gear assembly is designed so that an oil pressure control circuit thereof includes a manual valve having the six positions P, R, N, D, 2 and L to permit the speed change gear mechanism to provide a plurality of speed ranges. Accordingly, the coventional automatic speed change gear assembly is disadvantageous in the following points: It is necessary to provide a large space in the vehicle in order to provide the above-described operating lever. Furthermore, the operator may operate the operating lever erroneously. More specifically, the manual valve may be set to the position P for parking the vehicle or to the position R for running the vehicle in reverse while the vehicle is moving forwardly, or the manual valve may be switched to the position N in returning it to position D from either second or low.

Furthermore, in order to park the vehicle, it is necessary to shift the operating lever to a position corresponding to the position P of the manual valve. Accordingly, the conventional automatic speed change gear assembly suffers from difficulties in that it is troublesome to shift the operating lever to the P position whenever it is required to park the vehicle, and if the operator forgets to so set the operating lever in parking the vehicle on a slope, a hazard occurs in that the vehicle may roll unintentionally.

SUMMARY OF THE INVENTION

In view of the foregoing, a primary object of this invention is to provide an automatic speed change gear assembly in which the above-described hazards accompanying the erroneous operation of a conventional automatic speed change gear assembly are eliminated, and wherein operation is carried out completely automatically, and is simplified.

Another object of the invention is to provide an automatic speed change gear assembly in which the operating conditions of the vehicle are detected, so that the parking mechanism of the vehicle is automatically engaged, whereby the operability and the security thereof are improved.

The foregoing and other objects of the invention have been achieved by the provision of an automatic speed change gear assembly designed so that only when a signal from a vehicle stop sensor for detecting the stop of the vehicle is available are forward and backward movement instructions from the operator made effective. Furthermore, the objects of the invention have been achieved by the provision of an automatic speed change gear assembly designed so that when the signal from the vehicle stop sensor and an engine "off" signal from a key switch controlling the start and stop of the engine are available, the parking mechanism actuator of the vehicle is placed in an engagement state.

DETAILED DESCRIPTION OF THE PREFERRED EMBODIMENTS

One embodiment of this invention will now be described in detail with reference to the accompanying drawings.

Figure 1:
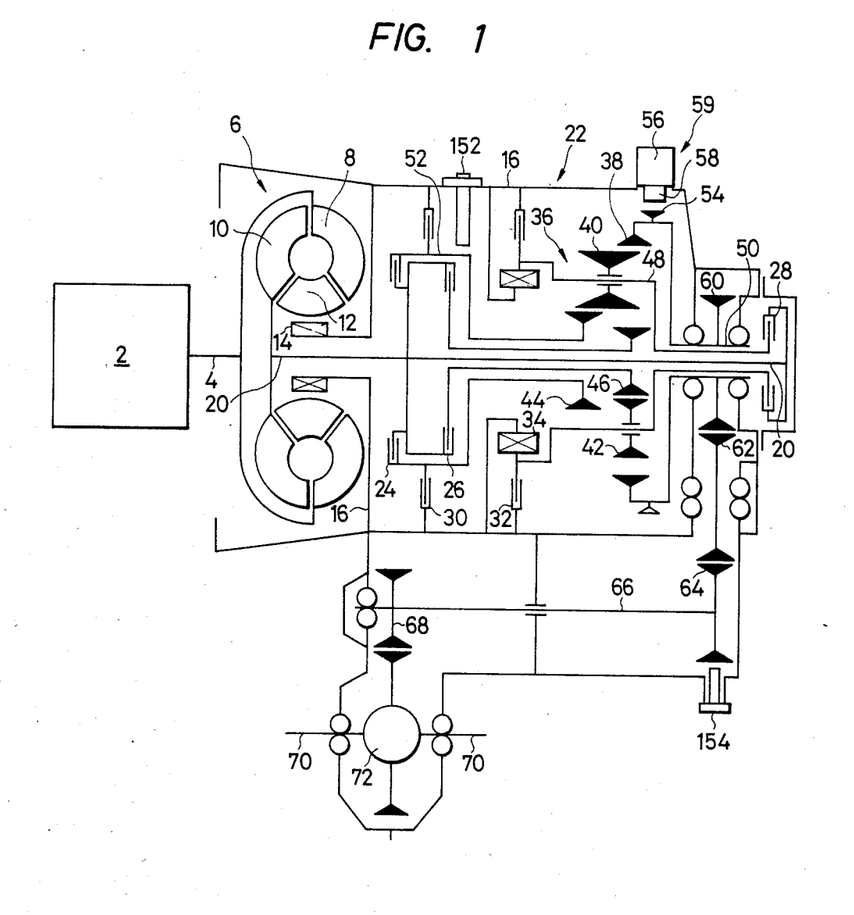
FIG. 1 is a power train chart showing an automatic speed change gear assembly according to one embodiment of this invention.

As shown in FIG. 1, the crank shaft 4 of an engine 2, which is the power source for the vehicle, is connected directly to the pump 8 of a torque converter 6. The torque converter 6 comprises the pump 8, a turbine 10, a stator 12 and a one-way clutch 14. The stator 12 is coupled through the one-way clutch 14 to a casing 16. By means of the one-way clutch 14, the stator 12 is allowed to turn in the same direction as the crank shaft 4, but it is not allowed to turn in the opposite direction.

The torque transmitted to the turbine 10 is transmitted through an input shaft 20 to a speed change gear assembly 22 which provides four forward ranges and one reverse range. The speed change gear assembly 22 comprises three clutches 24, 26 and 28, two brakes 30 and 32, a one-way clutch 34, and a planet gear mechanism 36. The planet gear mechanism 36 is made up of a ring gear 38, a long pinion gear 40, a short pinion gear 42, a front sun gear 44, a rear sun gear 46 and a rotatable carrier 48 which rotatably supports the pinion gears 40 and 42. The ring gear 38 is coupled to an output shaft 50. The front sun gear 44 is coupled through a kick down drum 52 and the front clutch 24 to the input gear 20. The rear sun gear 46 is coupled through the rear clutch 26 to the input shaft 20. The carrier 48 is coupled to the casing 16 through the low reverse brake 32 and the one-way clutch 34 which are arranged functionally in parallel. The carrier 48 is further coupled to the input shaft 20 through the fourspeed clutch 28 provided at the rear end of the speed change gear assembly 22. The aforementioned kick down drum 52 can be fixedly coupled to the casing 16 through the kick down brake 30. Engaging teeth 54 formed on the periphery of the ring gear 38 and a pawl 58 form a parking mechanism 59. The pawl 58 is extended by means of an actuator 56 including a motor and a solenoid, which is operated by a signal from an electronic control device (described later), as a result of which the pawl 58 is engaged with the engaging teeth 54, to thereby prevent rotation of the ring gear 38 (and accordingly the output shaft 50).

The torque passing through the planet gear mechanism 36 is transmitted through an output gear 60 secured to the output shaft 50 and an idler gear 62 to a driven gear 64. Torque is further transmitted through a transfer shaft 66 secured to the driven gear 64 and a helical gear 68 to a differential gear device 72 to which a drive shaft 70 is coupled.

Figure 2:
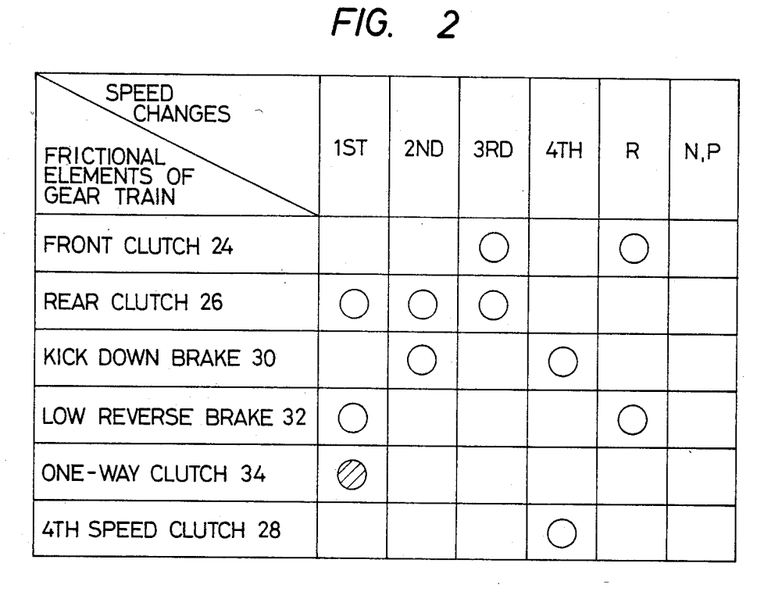
FIG. 2 is a table indicating the relationships between the operations of the frictional elements of the gear train and the speed ranges of the automatic speed change gear assembly.

The above-described clutches and brakes are frictional engagement devices including engaging piston units or servo units, and are operated by the oil pressure produced by an oil pump 74 driven by the engine 2 when coupled to the pump 8 of the torque converter 6. The oil pressure is selectively applied to the clutches and the brakes by an oil pressure control device (described hereafter) according to operating conditions detected by various operating condition detecting devices. The combinations of the operations of the clutches and the brakes provide the speed change ranges, namely, four forward ranges and one reverse range. FIG. 2 shows the relationships between the operations of the clutches and brakes and the various speed ranges. In FIG. 2, "O" indicates that the clutch or brake is in engagement, and "⊘" indicates that, immediately before the low reverse brake 32 engages to effect a speed change, the rotation of the carrier 48 is stopped by the action of the one-way clutch 34. The oil pressure and electronic control systems allowing the speed change gear assembly 22 (in FIG. 1) to provide the speed change ranges shown in FIG. 2 will now be described.

Figure 3A:
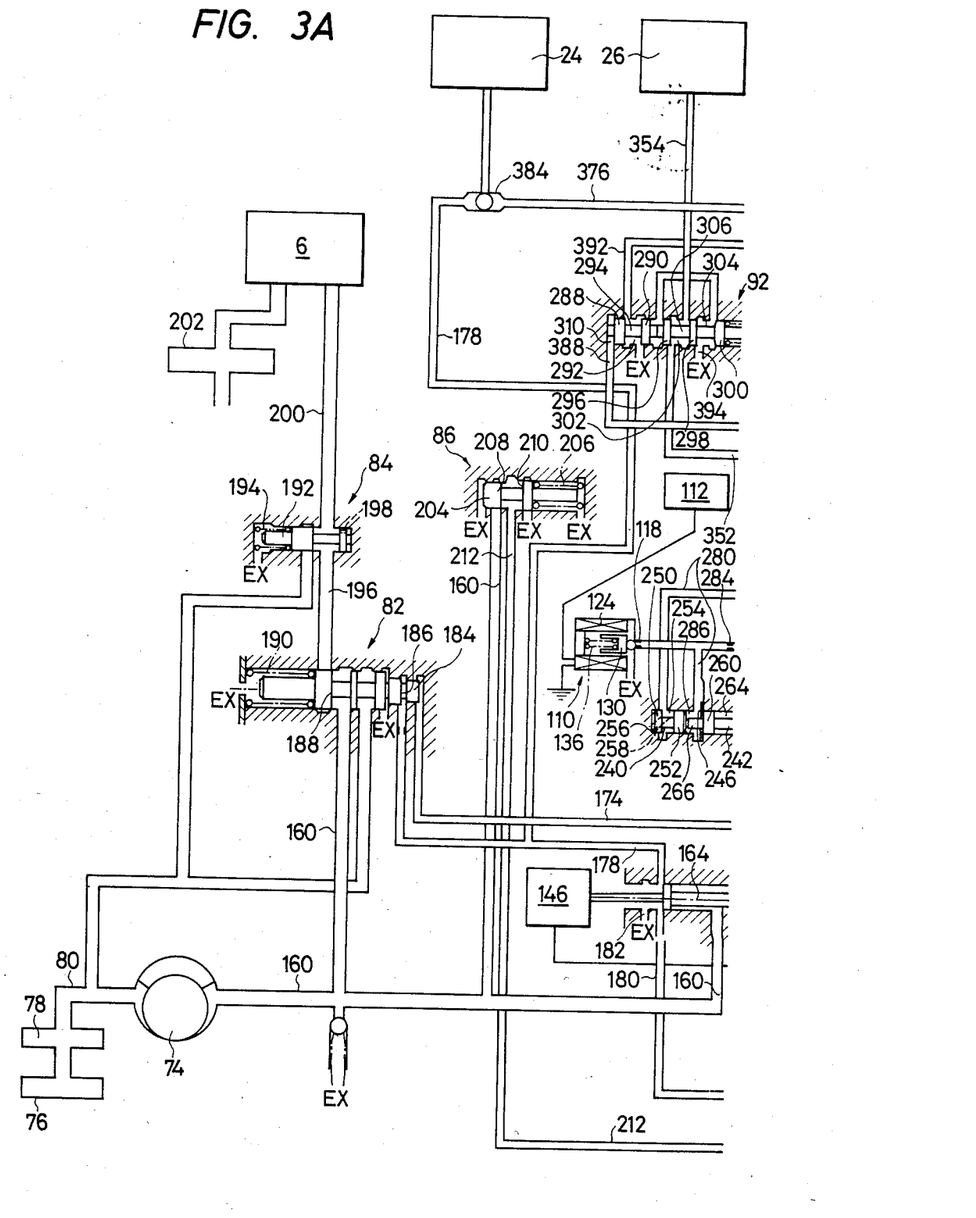
FIGS. 3A and 3B are a circuit diagram showing an oil pressure control device of the automatic speed change gear assembly.
Figure 3B:
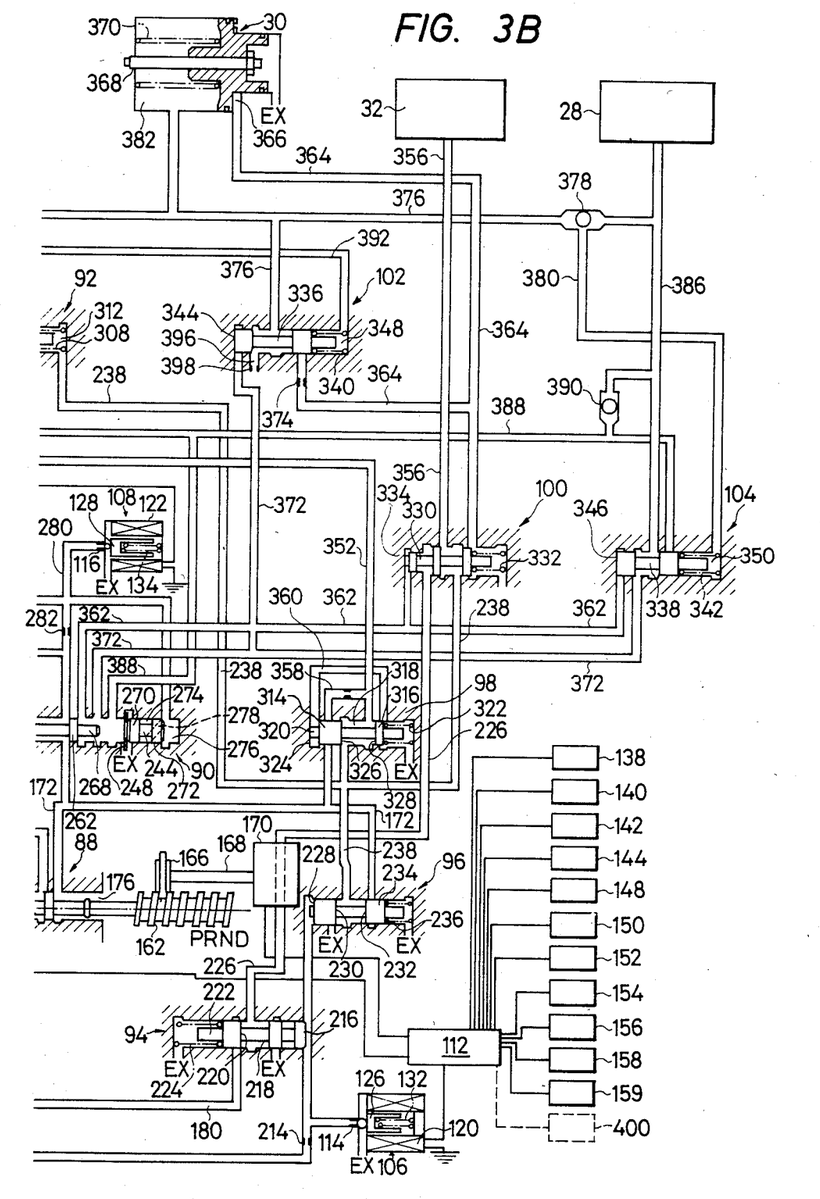

The oil pressure control device as shown in FIGS. 3A and 3B operates to selectively supply the pressurized oil, which is delivered from an oil pool 76 through an oil filter 78 and an oil path 80, according to the operating conditions to operate the piston units or servo units of the clutches 24, 26 and 28 and the brakes 30 and 32 of the speed change gear assembly 22 and the torque converter 6. The oil pressure control device comprises a vent valve 82, a torque converter control valve 84, a reducing valve 86, an operating condition change-over valve 88, a shift control valve 90, a rear clutch control valve 92, an N-R control valve 94, an oil pressure control valve 96 operated during a speed change, an N-D control valve 98, a first-second speed shift valve 100, a second-third speed and fourth-third speed shift valve 102, a four-speed clutch control valve 104, and solenoid valves 106, 108 and 110. These circuit elements are variously connected through oil paths to one another.

The solenoid valves 106, 108 and 110 are all of the same construction. More specifically, the solenoid valves are of the normally closed type which open and close orifices 114, 116 and 118 in response to electrical signals from an electronic control device 112, respectively. The solenoid valves 106, 108 and 110 have solenoids 120, 122 and 124, valves 126, 128 and 130 arranged in the solenoids to open and close the orifices 114, 116 and 118, and springs 132, 134 and 136 urging the valves 126, 128 and 130 to their closed positions, respectively.

The electronic control device 112 incorporates an operating condition determining device for detecting the operating conditions of the vehicle to determine the position of the operating condition change-over valve 88 and the open and close combinations of the solenoid of the solenoid valves 108 and 110 according to a process described hereafter, and a speed change detecting device for detecting the beginning of a speed change. The electronic control device 112 operates to control the position of the operating condition change-over valve 88, actuate and stop the solenoid valve 106 (which is subjected to duty control), control the pulse width of a pulse current at 50 Hz supplied to the solenoid valve 106 to change the valve opening time thereof to thereby control the oil pressure, and open and close the solenoid valves 108 and 110. Inputted to the electronic control device are signals from an advancement direction indicating switch 138 (hereinafter referred to merely as "an indicating switch 138") which is provided in the vehicle (not shown) where it can be operated readily by the operator and which indicates backward movement when turned on and forward movement when turned off; a door switch 140 for detecting the operation of the door by the driver's seat, the door switch 140 being turned on when the door is closed; a seat switch 142 provided on the driver's seat, the switch 142 being turned on when the driver sits on the seat; a side switch 144 for detecting the operating condition of a parking brake (or a side brake); a potentiometer 146 for detecting the position of the operation condition changeover valve 88; a valve opening degree sensor 148 for detecting the opening degree of a throttle valve (not shown) of the engine 2; an engine speed sensor 150 for detecting the speed of the engine 2; a drum speed sensor 152 for detecting the speed of the kick down drum 52 (FIG. 1); a gear speed sensor 154 for detecting the speed of the driven gear 64, to thereby detect the speed of the output shaft 50 and the speed of the vehicle; a pedal switch 156 which is turned on when the brake pedal of the vehicle (not shown) is depressed (or when the foot brake is operated); a low speed switch 158 which, when forward movement operating conditions hold, fixedly holds the speed change ratio in a lower speed range such as the second speed range; and a release switch 159 for releasing the parking mechanism 59 in priority irrespective of the operating conditions. Furthermore, the on-off signals of the vehicle key switches are applied to the electronic control device 112.

The indicating switch 138 is made up of a conventional push switch incorporating a relay. The operating condition of the switch is restored to the initial operating condition when the switch is operated twice. The switch 138 has restoring means which operates to set the switch 138 to the OFF position, i.e., the forward movement indicating position in response to a signal from the electronic control device 112. The gear speed sensor 154 operates to detect when the speed of the driven gear 64 reaches 0 r.p.m. or approximately 0 r.p.m., thereby to detect a vehicle speed of 0 km/h; that is, the sensor 154 can detect when the vehicle stops. Thus, the gear speed sensor 154 serves as a vehicle stop sensor.

The pressurized oil, which is discharged from the oil pump 74, is delivered through the oil path 160 to the vent valve 82, the operating condition change-over valve 88 and the reducing valve 86.

The operating condition change-over valve 88 is employed in place of the manual valve in the conventional automatic speed change gear assembly, and comprises a spool 164 having a threaded groove 162 at the outer end portion, a servo motor 170 having a rotary shaft 168 fixedly secured to a disk 166 engaged with the threaded groove 162, the servo motor 170 being operated in response to an electrical signal from the electronic control device 112, and a potentiometer 146 coupled to the spool 164, to feed back an electrical signal corresponding to the position of the spool 164 to the electronic control device 112. The operating condition change-over valve 88 is controlled by the electronic control device 112 according to a control process described hereinafter. The change-over valve 88 has four positions; D, N, R and P. When the valve 88 is at the position D, the oil path 160 communicates with oil paths 172 and 174, to allow the speed change gear assembly 22 to provide the forward movement operating conditions in the first through fourth speed ranges according to the on-off combinations of the solenoid valves 108 and 110 as will be described later. When the valve 88 is at the position N, the oil path 160 communicates with the oil path 174 only, and the oil path 172 communicates with an oil discharging outlet 176, so that the speed change gear assembly 22 is placed in the neutral state. When the change-over switch is set to the position R, the oil path 160 communicates with oil paths 178 and 180, so that the speed change gear assembly 22 provides the reverse range. When the change-over switch 88 is set to the position P, all the oil paths to the change-over switch 88 are communicated with the oil discharging outlet 176 or 182, so that the speed change gear assembly 22 is placed substantially in the neutral state. Simultaneously when the signal for setting the operating condition change-over valve 88 to the position P is produced by the electronic control device 112, a signal is applied to the actuator 56 (FIG. 1) by the electronic control device 112. As a result, the actuator 56 is driven, so that the pawl 58 is engaged with the engaging teeth 54 to stop the rotation of the output shaft 50, whereby the vehicle is placed in the parked state.

The vent valve 82 comprises a spool 188 having pressure receiving surfaces 184 and 186, and a spring 190. When the oil pressure in the oil path 160 acts on the pressure receiving surface 184 through the oil path 174, the oil pressure in the oil path 160 is adjusted to a constant value of 6 kg/cm² (hereinafter referred to as the line pressure) by the vent valve 82. When the oil pressure in the oil path 160 acts on the pressure receiving surface 186 through the oil path 178, the oil pressure in the oil path 160 is adjusted to 14.6 kg/cm².

The torque converter control valve 84 comprises a spool 192 and a spring 194. The control valve 84 operates to adjust the pressurized oil introduced through an oil path 196 from the vent valve 82, to 2.5 kg/cm² by balancing the oil pressure acting on the right pressure receiving surface of the spool 192 through a passage 198 formed in the spool 192 and the energization force of the spring 194, and to apply the pressurized oil thus adjusted to the torque converter 6 through an oil path 200. The oil which is discharged from the torque converter 6 is supplied through an oil cooler 202 to lubricate the various parts of the speed change gear assembly.

The reducing valve 86 comprises a spool 204 and a spring 206. The reducing valve 86 operates to adjust the oil pressure from the oil path 160 to 2.4 kg/cm² by balancing the oil pressure due to the difference in area between the opposed pressure receiving surfaces 208 and 210 of the spool 204 and the energization force of the spring, and to apply the oil pressure thus adjusted to an oil path 212. The pressure-adjusted oil introduced to the oil path 212 is supplied through an orifice 214 to the N-R control valve 94, the oil pressure control valve 96 and an orifice 114 of the solenoid valve 106.

The N-R control valve 94 comprises a spool valve 222 having pressure receiving surfaces 216, 218 and 220, and a spring 224. The control valve 94 operates to adjust the oil pressure of the oil path 226 to a predetermined value by balancing the oil pressure acting on the pressure receiving surface 216 and the composite force of an oil pressure due to the difference in area between the pressure receiving surfaces 218 and 220 and the energization force of the spring.

The oil pressure control valve 96 has a spool valve 234 with pressure receiving surfaces 228, 230 and 232, and a spring 236. The control valve 96 operates to adjust the oil pressure of an oil path 238 to a predetermined value by balancing the oil pressure acting on the pressure receiving surface 228, and the composite force of an oil pressure due to the difference in area between the pressure receiving surfaces 230 and 232 and the energization force of the spring 236.

The adjusted oil pressure, which is introduced to the oil path 226, is for controlling the low reverse brake 32 is providing the reverse range. The adjusted oil pressure, which is introduced to the oil path 238, is for controlling the front clutch 24, the rear clutch 26, the kick down brake 30 and the low reverse brake 32 when the vehicle is being run forwardly or stopped.

The solenoid valve 106 is subjected to duty control with a constant frequency pulse current of 50 Hz, the pulse width of which is changed according to the operating conditions, by the electronic control device 112. That is, the pulse width is changed, to vary the ratio of opening time to closing time of the orifice, to thereby control the oil pressure in the oil path 212 downstream of the orifice 214, i.e., the oil pressure $P_1$ applied to the pressure receiving surface 216 of the N-R control valve 94 and to the pressure receiving surface 228 of the oil pressure control valve 96. For instance, in the case where the diameters of the orifices 214 and 114 are 0.8 mm and 1.4 mm, respectively, the oil pressure $P_1$ is adjusted in the range of about 0.3 to 2.1 kg/cm². As the oil pressure $P_1$ is increased or decreased as described above, the adjusted oil pressure in the oil paths 226 and 238 is proportionally increased and decreased in the range of from about 0 kg/cm² to the supply oil pressure (which is the oil pressure in the oil path 180 or 172).

The operation start timing and the operating period of the solenoid valve 106 described above are determined according to the electrical signals provided by the throttle valve opening degree sensor 148, the speed sensors 150, 152 and 154, a speed change detecting unit incorporated in the electronic control device 112 to detect the start of a speed change and an engaging timing detecting device comprising two speed sensors 152 and 154.

Figure 4:
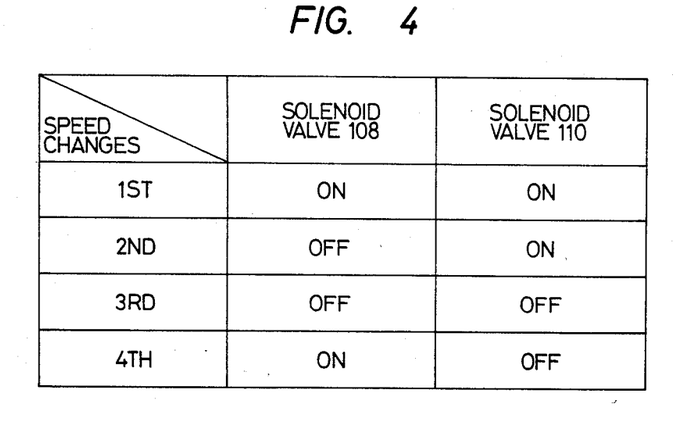
FIG. 4 is a table indicating the relationships between solenoid valve operations and the speed ranges.

The shift control valve 90 is controlled by combining the opening and closing operations of the solenoid valves 108 and 110. The shift control valve 90 has three spools 240, 242, 244 and two stoppers 246 and 248. The spool 240 has lands 250 and 252, an annular groove 254 and an oil path 258 which communicates the groove 254 with an oil chamber 256 on the left side of the land 250. The spool 242 has lands 260 and 262 different in diameter from each other, an annular groove 264, and abutting parts 266 and 268 which are abutted against the spools 240 and 244, respectively. The spool 244 has lands 270 and 272, an annular groove 274, and an oil path 278 communicating the groove 274 with an oil chamber 276 on the right side of the land 272. The stoppers 246 and 248, being held between the spools 240 and 242, are fixedly secured to the casing. The oil path 172 communicates with an oil path 280 through the annular groove 264 at all times. The oil path 280 communicates through an orifice 282 with the orifice 116, the left oil chamber 256 and the right oil chamber 276, and through an orifice 284 to an orifice 118 and an oil chamber 286 between the spools 240 and 242. The combination of the opening and closing operations of the solenoids 108 and 110 are related to the speed change ranges as shown in FIG. 4.

The rear clutch control valve 92 has a spool 294 which includes a land 288, a land 290 smaller in diameter than the land 288, and an annular groove; a spool 306 which includes three lands 296, 298 and 300 equal in diameter to the land 290, and annular grooves 302 and 304; and a spring 308. When the oil pressure introduced into an oil chamber 310 (on the upper right side in FIG. 3A) to act on the pressure receiving surface of the land 288 becomes larger than the composite force of the oil pressure introduced to an oil chamber 312 (on the upper left side in FIG. 3A) to act on the pressure receiving surface of the land 300 and the energization force of the spring 308, the spools 294 and 306 are displaced to the right in FIGS. 3A and 3B. Upon displacement of the spools 294 and 306 to the right, the oil pressure is applied between the lands 290 and 294. Therefore, when the oil pressure is removed from the oil chamber 310, only the spool 294 is moved to the left. Thereafter, when the oil pressure applied to the left pressure receiving surface of the land 296 becomes smaller than the composite force of the pressure in the oil chamber 312 and the force of the spring 308, the spool 306 is moved leftwardly.

The N-D control valve 98 has a spool 320 which includes lands 314 and 316 and an annular groove 318, and a spring 322. The spool 320 is displaced selectively between the left end position shown in FIG. 3B and the right end position according to the direction of the composite force of oil pressures applied to the pressure receiving surfaces 324, 326 and 328 of the spool 320 and the force of the spring 322.

The first-second speed shift valve 100 comprises a spool 330 and a spring 332. The spool 330 is displaced between the left end position as shown in FIG. 3B and the right end position depending on whether or not the line pressure is applied to the left pressure receiving surface 334 of the spool. When the line pressure is supplied to act on the pressure receiving surface 334, the spool 330 is moved to the right end. When the line pressure is removed, the spool is moved to the left by spring 332.

Similarly, the second-third and fourth-third speed shift valve 102 and the four-speed clutch control valve 104 have a spool 336 and a spring 340, and a spool 338 and a spring 342, respectively. Oil chambers 344 and 346 to which the line pressure is introduced are formed on the left sides of the spools 336 and 338, respectively, and oil chambers 348 and 350 are formed on the right sides thereof, respectively. These spools are displaced selectively to either the left end positions as shown in FIG. 3B or to the right end positions.

Speed change control by selective engagement of the frictional engaging devices will now be described.

When the electronic control device 112 drives the servo motor 170 according to a control process (described hereafter) until the spool 164 of the operating condition change-over valve 88 is set to the position D, the line pressure in the oil path 160, which has been adjusted to 6 kg/cm², is conducted through the oil path 172 to the shift control valve 90. If, in this case, the solenoid valves 108 and 110 are electrically energized, the orifices 116 and 118 are open. Accordingly, the oil pressures in the oil chambers 256, 276 and 286 are not increased, the spool 242 is set to the left end position (as shown in FIGS. 3A and 3B) by the oil pressure which is provided according to the difference in pressure receiving surface area between the lands 260 and 262, and the line pressure is not conducted to other oil paths communicating with the shift control valve 90.

The line pressure in the oil path 172 is led through the oil pressure control valve 96, the oil path 238, the N-D control valve 98, the oil path 352, the rear clutch control valve 92 and the oil path 354 to the oil pressure chamber of the rear clutch 26, and is led through the oil path 238, the first-second speed shift valve 100 and the oil path 356 to the oil pressure chamber of the low reverse brake 32. Thus, the first speed range is obtained by engagement of the rear clutch 26 and the low reverse brake. In this case, the operation of the oil pressure control valve 96 prevents an abrupt rise of the oil pressure in the oil pressure chamber of the rear clutch 26, to reduce the speed change shock.

The operation of the N-D control valve 98 in this operation is as follows: When the oil pressure is led from the oil path 358 to the annular groove 318, the spool 320 is displaced to the right hand side in FIG. 3B against the elastic force of the spring 322 by the difference in area between the pressure receiving surfaces 326 and 328, as a result of which the communication of the oil path 238 with the oil path 352 is interrupted, and the oil path 172 communicates through an oil path 358 with an oil path 352 and with an oil path 360. Accordingly, as long as the operating condition change-over valve 88 is set to the position D, the oil path 172 communicates with the oil path 352 while bypassing the oil pressure control valve 96. Accordingly, the oil pressure applied to the oil pressure chamber of the rear clutch 26 is not affected by the oil pressure reduction control effected by the oil pressure control valve 96 at the time of speed change, and therefore the occurrence of difficulties such as speed change shock due to the slip of the rear clutch 26 in changing the speed range and the idling of the engine can be prevented.

When, under the condition that the first speed range has been obtained, the acceleration pedal is depressed to increase the speed of the vehicle, the electronic control device 112 issues a second speed range instruction in response to signals from the throttle valve opening degree sensor 148 and the gear speed (vehicle speed) sensor 154, so that the solenoid valve 108 is deenergized, while the solenoid valve 110 is maintained energized. By this switching operation, the line pressure in the oil path 280 is led through the orifice 282 to the annular groove 254, the oil path 258, the oil chambers 256 and 276 and the annular groove 274. As a result, the spool 240 together with the spool 242 is moved to the right and is stopped in abutment against the stopper 246, whereupon the line pressure in the oil path 172 is conducted through the annular groove 264 to the oil path 362 and is applied to the pressure receiving surface 334 of the first-second speed shift valve 100 and the pressure receiving surface 346 of the four-speed clutch control valve. As a result, spools 330 and 338 of the valves 100 and 104 are moved to their right end positions. As a result, the line pressure in the oil path 238 is applied through the oil path 364 to the oil chamber 366 on the engagement side of the kick down brake 30 so as to move the rod 368 to the left against the elastic force of the spring 370, so that a brake band (not shown) is engaged with the kick down drum 52. At the same time, the oil pressure in the oil path 356 is discharged through the oil path 226 to release the engagement of the low reverse brake 32. Thus, the second speed range is obtained. In this operation, the oil pressure control valve 96 reduces, in response to the oil pressure control operation of the solenoid valve 106, the oil pressure in the oil path 238, i.e., the oil pressure which is applied to the oil chamber 366 of the kick-down brake 30, thereby to prevent speed change shock.

When the application of current to the solenoids 108 and 110 is interrupted in order to obtain the third speed range in response to an instruction from the electronic control device, the line pressure is applied to the oil chamber 286 through the orifice, the spool 242 is moved right in FIG. 3 by the line pressure acting on the pressure receiving surface of the land 260 and is stopped in abutment against the spool 244, and the oil path 172 communicates with an oil path 372. The line pressure led to the oil path 372 acts on the pressure receiving surface 344 of the second-third speed and fourth-third speed shift valve 102, so that the spool 336 of the valve 102 is moved to the right and therefore the oil path 364 communicates through the orifice 374 with the oil path 376. The oil pressure led to the oil path 376 is supplied through the change-over valve 378 and the oil path 380 to the oil chamber 350 of the four-speed clutch control valve 104, and to release side oil chamber 382 of the kick-down brake 30 and through the change-over valve 384 to the front clutch 24. As the oil path 376 communicates with the oil chamber 382 of the kick-down brake 30 and the front clutch 24, engagement and disengagement of the two elements are carried out in an overlapping fashion.

In shifting from the second speed range to the third speed range, the oil pressure control valve 96 is operated completely similarly as when shifting from the first speed range to the second speed range, so that the oil pressure in the oil path 238 is maintained at a low level for a short period of time.

The oil path 364, which communicates through the first-second speed shift valve 100 to the oil path 238, is coupled to an orifice 374. During the operation of the oil pressure control valve 96, by the action of the orifice 374, the oil pressures in the release side oil chamber 382 of the kick-down brake 30 and the oil chamber of the front clutch 24 are maintained equal to one another, engagement of the front clutch 24 is carried out in parallel with the release of the brake 30, and thereafter when the operation of the oil pressure control valve 96 is stopped to raise the oil pressure to 6 kg/cm² the engagement of the front clutch 24 is accomplished. Thus, the third speed is obtained. In this case, the rotational speed of the input shaft 20 and the kick-down drum 52 approaches that of the output shaft, and finally the former becomes equal to the latter. The time instant when the two rotational speeds become equal, or immediately before the two rotational speed become equal, being regarded as the time instant when shifting has been accomplished, is detected by the speed sensor 152 and 154. Upon detection of this time instant, the operation of the oil pressure control valve 96, i.e., the operation of the solenoid valve 106 is stopped, to raise the supply pressure to the front clutch 24 to 6 kg/cm². By this pressure increase, the oil pressure in the oil chamber 350 of the four-speed clutch control valve 104 is also increased, so that the spool 338 is displaced to the left end position in FIG. 3, the line pressure in the oil path 372 is applied through the oil path 386 to the four-speed clutch 28, and the latter 28 is placed in its engagement state.

The oil path 386 communicates through a switching valve 378 and an oil path 380 to the oil chamber 350. Once the line pressure is supplied to the oil path 386, the spool 338 of the four-speed clutch control valve 104 is maintained at the left end position in FIG. 5 until the line pressure is removed from the oil path 386, to thereby prevent a difficulty wherein, in shifting from the third speed range to the fourth speed range or vice versa, the clutch 28 is released or slips whereby the shifting of the speed range becomes impossible or the neutral state is provided.

In order to obtain the fourth speed range in response to an instruction from the electronic control device 112, the solenoid valve 108 is energized and the solenoid valve 110 is maintained deenergized. The oil pressures in the oil chambers 256 and 276 of the shift control valve 90 are thus decreased, so that the spool 244 together with the spool 242 is moved to the right end position in FIGS. 3A and 3B. As a result, the line pressure in the path 172 is led through the oil path 388 to the oil chamber 310 of the rear clutch control valve 92 and through the check valve 390 to the oil path 386. The spools 294 and 306 of the rear clutch control valve 92 are moved to the right end positions in FIG. 3B by the line pressure applied to the oil chamber 310, the oil path 388 is thus communicated with the oil path 392, the line pressure is supplied to the oil chamber 348 of the second-third speed and fourth-third speed shift valve 102, and the spool 336 of the valve 102 is moved to the left end position FIG. 3B. In this operation, the oil pressure in the oil chamber of the rear clutch 26 is discharged through the oil discharge outlet 394 of the rear clutch control valve 92, so that the rear clutch 26 is immediately released. On the other hand, the oil pressure in the oil chamber of the front clutch 24 and the oil pressure in the oil chamber 382 of the kick-down brake 30 are eliminated through the oil discharge outlet 396 of valve 102, so that the front clutch 24 is released and the kick-down brake 30 is engaged. Similarly as in the case of changing from the first speed range to the second speed range or from the second speed range to the third speed range, the oil pressure control valve 96 is operated to reduce the oil pressure in the oil path 238 for a short period of time during the speed changing operation, whereby the oil pressure acting on the oil chamber 266 of the kick-down brake 30 is decreased, so that the engagement thereof is carried out smoothly. Thereafter, when this oil pressure is increased to 6 kg/cm², the engagement is achieved. Thus, the fourth speed range has been obtained.

Now, downshifting will be described. The procedure of switching the operating paths of the oil pressure is opposite that in the case of the above-described upshifting sequence. In order to change the fourth speed range to the third speed range in response to an instruction from the electronic control device 112, the solenoid valves 108 and 110 are deenergized, as a result of which the line pressure in the oil path 388 is eliminated. In this case, the line pressure from oil path 352 is applied to the left pressure receiving surface of the land 296 of the rear clutch control valve 92, and similarly as in upshifting, the oil pressure control valve 96 is operated to reduce the oil pressure in the oil path 238. Therefore, only the spool 294 is moved to the left end position, so that the oil pressure in the oil path 392 is eliminated, and the spool 336 of the second-third speed and fourth-third speed shift valve 102 is moved to the right position. As a result, the oil pressure in the oil path 364 is smoothly applied through the orifice 374 and the oil path 376 to the oil chamber 382 of the kick-down brake 30 and the front clutch 24. When release of the kick-down brake 30 and engagement of the front clutch 24 are substantially achieved, the operation of the oil pressure control valve 96 is stopped and the oil pressure in the oil path 238 is increased. Therefore, the spool 304 of the rear clutch control valve 92 is moved to its left end position, so that the line pressure from the oil path 352 is supplied through the oil path 354 to the rear clutch 26 whereby the latter is engaged. Thus, the third speed range is obtained.

The rear clutch 26 is thus engaged later than the front clutch 24. This is to reduce the speed change shock which is caused when the rear clutch, which is larger in torque capacity, is engaged first.

When the third speed range is changed to the second speed range, the solenoid valve 108 is deenergized, while the solenoid valve 110 is energized, so that the oil pressure in the path 372 is eliminated. Therefore, the spool 338 of the four-speed clutch control valve 104 is moved to the right end position so that the oil pressure in the oil path 386 is discharged through the oil path 388, while the spool 336 of the shift valve 102 is moved to the left position so that the oil pressure in the oil path 376 is discharged. Thus, the four-speed clutch 28 and the front clutch 23 are released, while the kick-down brake 30 is engaged. Thus, the second speed range is obtained. In this speed change, similarly as in the above-described case, the oil pressure control valve 96 is operated, so that the kick-down brake 36 is smoothly engaged, thus preventing speed change shock.

When the second speed range is downshifted to the first speed range, the solenoids 108 and 110 are energized. As a result, the spools 240 and 242 of the shift control valve 90 are moved to the left positions to remove the oil pressure from the oil path 362, while the spool of the four-speed clutch control valve 104 is moved to its left end position, to remove the oil pressure from the oil chamber 366 of the kick-down brake 30, whereby the latter is released and the low reverse brake 32 is engaged. Thus, the first speed range is obtained.

When the electronic control device 112 outputs a signal to drive the servo motor 170 to thereby set the spool 164 of the operating condition change-over valve 88 to the position R, the oil path 160 communicates with the oil paths 178 and 180. The oil path 180 communicates through the N-R control valve 94, the oil path 226, the first-second speed shift valve 100 and the oil path 356 to the low reverse brake 32, while the oil path 178 communicates through the switching valve 384 to the front clutch 24. Therefore, the front clutch 24 and the low reverse brake 32 are engaged, to obtain the reverse range. In this case also, similarly to when changing the forward drive speed ranges, the solenoid valve 106 is operated for a short period of time, and the oil pressure applied to the low reverse brake 32 is maintained at a low level by the control of the N-R control valve 94, so that shock is prevented.

Figure 5A:
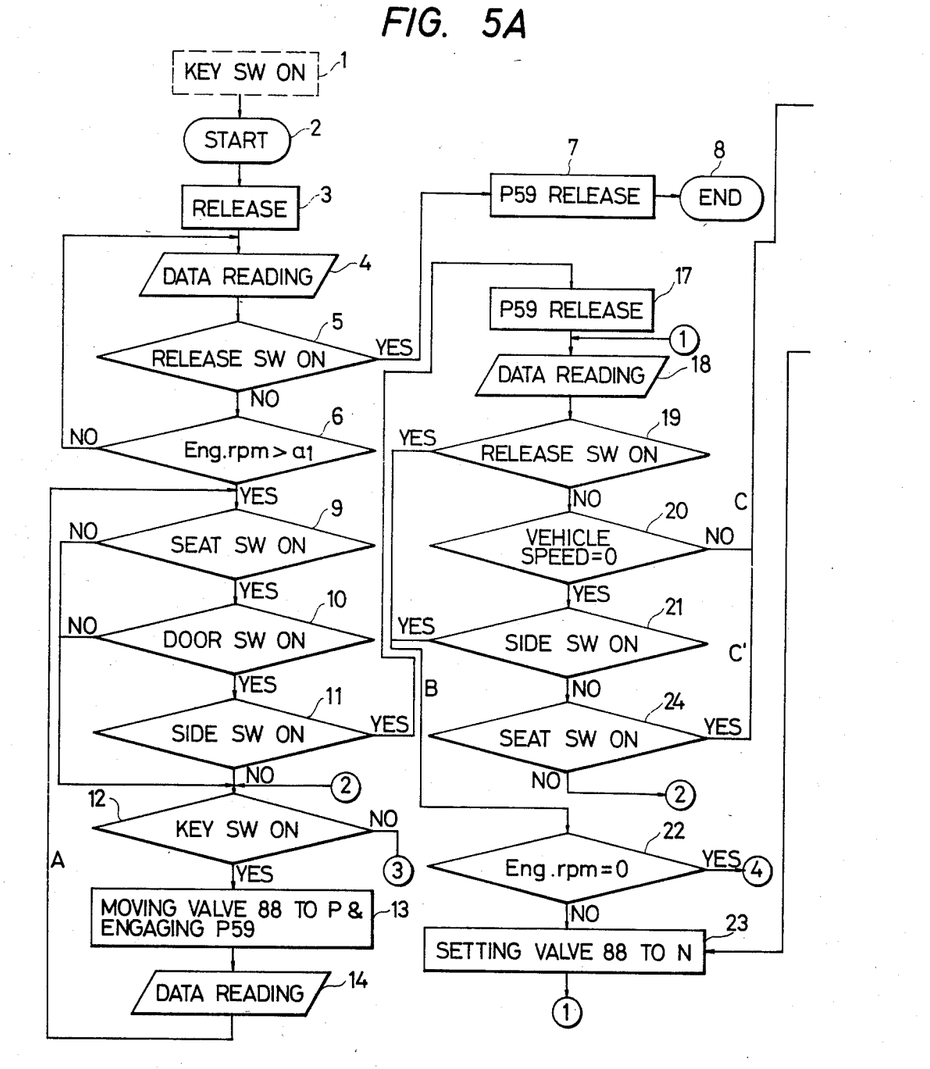
FIGS. 5A, 5B, and 5C are a flow chart describing the control of an operating condition change-over valve and the solenoid valves of the oil pressure control device.
Figure 5B:
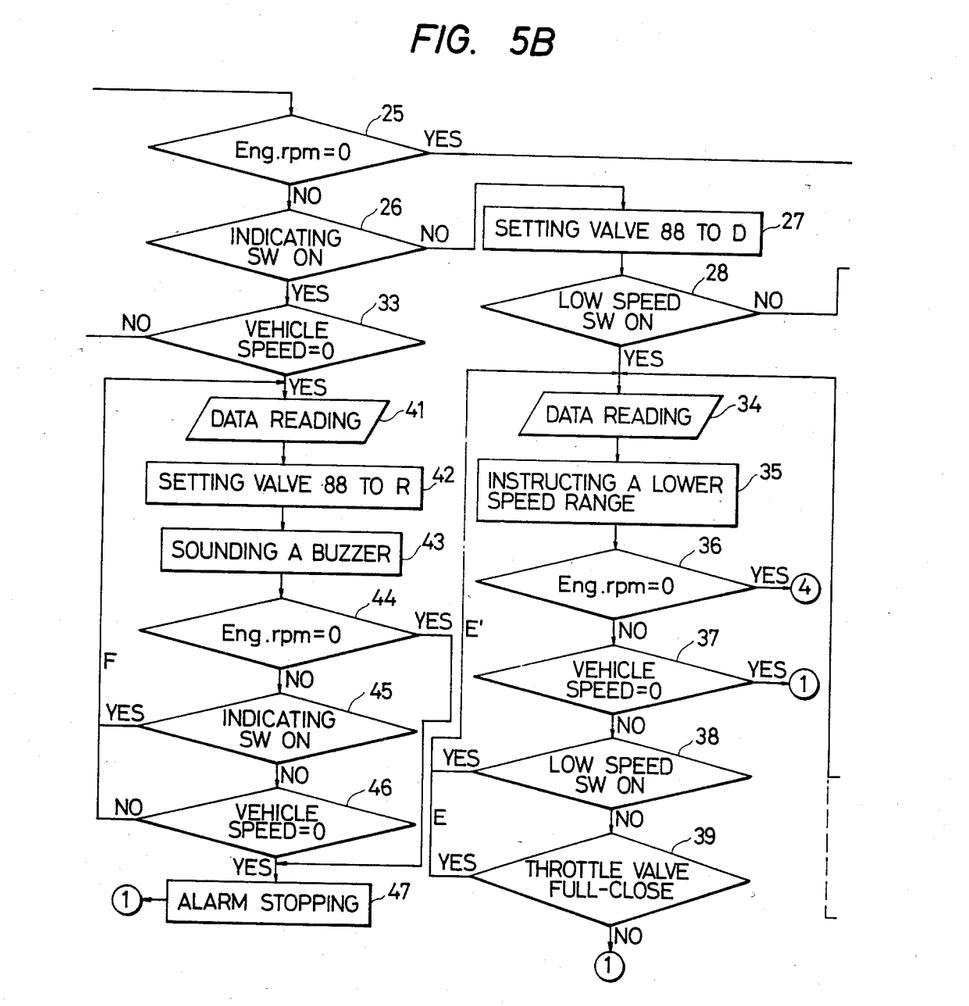
Figure 5C:
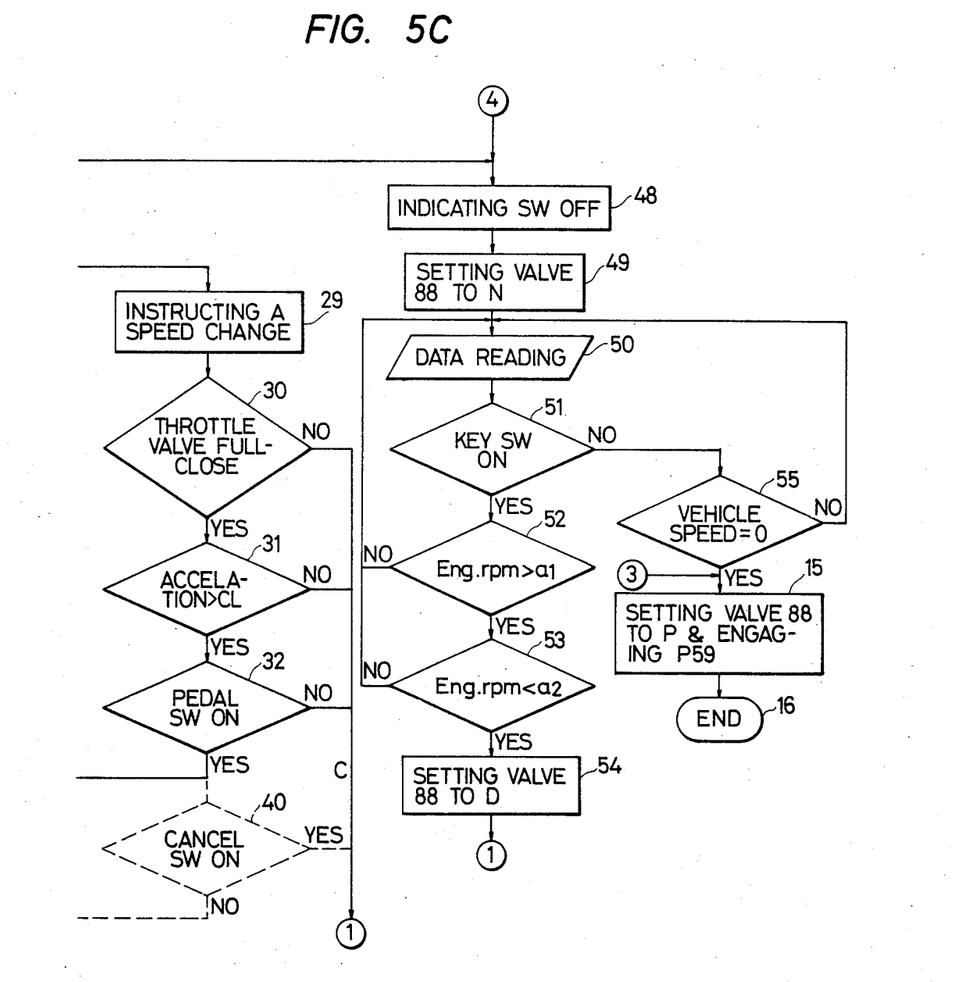

The operating condition change-over valve 88 and the solenoid valves 108 and 110 are switched according to a control process shown in FIGS. 5A–5C by the electronic control device 112 in response to signals provided by the various switches and sensors.

In FIG. 5A, reference character (1) designates a key switch "on" process. In process (1), the power switch is turned on, to perform a program start process (2). Thereafter, a release switch 159 is turned off, so as to prevent the occurrence of a problem wherein if the release switch 159 is in an "on" state, the parking mechanism 59 (indicated by reference character p59 in FIGS. 5A–5C) can be released immediately after the key switch "on" process (1). Thereafter, a data reading process (4) is carried out. Then, a release switch status determining process (5) for determining whether or not the release switch 159 is in an "on" state, is carried out. When the result of this process is "No," a process (6) for determining whether or not the speed of the engine is more than a predetermined value $a_1$ (for instance 600 r.p.m) is carried out. When the result of this determination is "No," then the reading process (4) is effected again. That is, processes (4), (5) and (6) are carried out again. When, during this operation, the operator turns on the release switch 159, a "Yes" is obtained as the result of process (5), so that process (7) for releasing the parking mechanism 59 is carried out, and a program ending process (8) is then performed. Thus, even when the key switch is turned off, the parking mechanism 59 remains released. This is useful when the vehicle must be towed, for instance, when the engine becomes out of order. While the processes (4) through (6) are repeatedly carried out as described above, the key switch may be set to the starter position, to operate the engine. When the speed of the engine reaches the predetermined value $a_1$, a "Yes" is obtained as the result of the process (6). Therefore, a determining process (9) for determining whether or not the seat switch 142 is in an "on" state, a process (10) for determining whether or not the door switch 140 is turned on, and a process (11) for determining whether or not a side switch is turned on are carried out. The process (9) detects whether or not the operator sits on the seat; process (10) detects whether or not the door beside the operator's seat is closed; and process (11) determines whether or not the parking brake is operated. When a "No" is provided as a result of any one of the processes (9) through (11), a process (12) for determining whether the key switch is turned on or off is carried out. When "Yes" is provided as a result of this process, a process (13) is carried out in which the operating condition change-over switch 88 is moved to the position P or held there and the parking mechanism 59 is engaged, so that the vehicle is placed in parked state. Then, a data reading process (14) is carried out, and the determining process (9) through (14) (hereinafter referred to as process loop A) are again carried out. These processes are inserted to avoid any danger that the vehicle might start running immediately after the engine has been operated or that the vehicle may be caused to roll down a slope by inertia when the parking mechanism 59 is released. These processes allow for engine warm up before the vehicle starts running, and does not allow the auto to be run before the steps in which the operator sits down on the driver's seat and closes the door with the parking brake in operation have been achieved. If the engine is stopped while process loop A is being carried out, the starter should be operated to start the engine again. In this case, process loop A is repeated again. When the key switch is turned off during this period, "No" is obtained as a result of process (12). Therefore, a process (15) for placing the vehicle in a parking state (similarly as in process (13)) is carried out, and a program ending process (16) is effected.

When the results of the determining processes (9), (10) and (11) are all "Yes," a process (17) for releasing the parking mechanism 59 and a process (18) for reading data are carried out, and a release switch status determining process (19) is carried out. When a "No" is provided as a result of process (19), i.e., when the release switch 159 is in the "off" state, process (20) for determining whether or not the vehicle is stopped, i.e., whether or not the vehicle speed is 0 km/h, is carried out. When process (20) is carried out immediately after processes (9), (10), (11), (17) and (18), "Yes" is provided as a result of process (20) because the vehicle speed is generally 0 km/h. In this case, the parking brake is normally in operation, and therefore "Yes" is obtained as a result of the side switch on status determining process (21). Accordingly, a process (22) for determining whether or not the speed of the engine is 0 r.p.m is performed. When the result of this determination is "No," a process (23) for setting the operating condition change-over valve 88 to the position N is conducted, and the data reading process (18) is effected. As long as the parking brake is in operation, the processes (18) through (23) (hereinafter referred to as process loop B) are repeated.

When, during process loop B, the operator releases the parking brake and "No" is provided as a result of process (21), a seat switch "on" determining process (24) is conducted. When "Yes" is provided as a result of process (24), process (25) for determining whether or not the speed of the engine is 0 r.p.m. is carried out. When the result of this process (22) yields "No," an indicating switch status determining process (26) for determining whether the indicating switch 138 indicates forward movement or reverse movement, i.e., whether the indicating switch 138 is turned off or turned on, is performed.

When "No" is provided as a result of process (26), i.e., when forward movement is indicated, a process (27) for setting the operating condition change-over switch 88 to the position D is performed and a process (28) is carried out to determine whether or not a low speed switch 158 for maintaining the change gear ratio in the low range is turned on. When "No" is provided as a result of this process (28), a process (29) for instructing a speed change is performed. In the speed change instructing process (29), the electronic control device 112 applies signals to the solenoid valves 108 and 110 to provide a forward speed range which is suitable for the operating conditions of the vehicle at that time. After process (29) has been achieved, a process (30) for determining whether or not the throttle valve is fully closed, a process (31) for determining whether or not acceleration of the vehicle is larger than a predetermined value $C_1$, and a process (32) for determining whether or not the foot brake is in operation, i.e., whether or not the pedal switch 156 is turned on, are carried out. When "No" is provided as a result of any one of the processes (30), (31) and (32), the data reading process (18) is again effected. When the vehicle is run ordinarily and accelerated with the throttle valve open, when the vehicle is running down a slope with the throttle being fully closed and with the acceleration being maintained smaller than the predetermined value $C_1$, and where the vehicle is being decelerated, processes (18), (19), (20), (25), (26), (27), (28), (29), (30), (31) and (32) (hereinafter referred to as process loop C) are repeatedly performed.

When, during process loop C, the vehicle is stopped after being decelerated, i.e., when the vehicle speed becomes 0 km/h, a "Yes" is provided as the result of process (20), and a process loop C' in which the processes (21) and (24) are inserted between processes (20) and (25) of process loop C is effected. When, under this condition (i.e., where the vehicle is stopped), the parking brake is operated, the side switch 144 is thus turned on, and a "Yes" is provided as the result of process (21). Thus, process loop B is again effected, and the speed change gear assembly 22 is set in the neutral state. If the vehicle is stopped by the foot brake in process loop C', and the operator then leaves the vehicle without applying the parking brake, a "No" is provided as the result of the seat switch actuation determining process (24). Therefore, after completing determining process (12), process (13) for parking the vehicle is performed, to prevent the vehicle from being run without an operator. In this case, processes (12), (13), (14), (9) and (12) are effected. Therefore, even if the operator then sits on the driver's seat and a "Yes" is provided as the output of process (9), the operation sequence is not shifted over to process loops C or C' unless the parking brake is operated.

When, during forward running with process loop C repeatedly carried out, the operator or a passenger turns on the indicating switch 138 (indicating reverse) by accident, a "Yes" is provided as the result of determining process 26. However, since "No" is provided as the result of process (33) (determining whether or not the vehicle speed is 0 km/h), process (23) for setting the operating condition change-over valve 88 to the N position is carried out and the speed change gear assembly 22 is placed in neutral. The processes (18), (19), (20), (25), (26), (33) and (23) are carried out until the indicating switch 138 is again switched to indicate forward driving or until the vehicle speed is reduced to 0 km/h. When the indicating switch 138 is turned off again, the above-described process loop C is again carried out and the forward speed range is reinstated. Accordingly, if the operator turns on the indicating switch 138 by mistake during forward driving of the vehicle, no reverse speed range is provided. This greatly contributes to the operational security of the vehicle.

In the condition that the process loop C consisting of processes (18), (19), (20), (21), (24), (25), (26), (27), (28), (29), (30), (31) and (32) is being repeated, when the operator operates the foot brake because the vehicle is running down a slope with the throttle valve fully closed and with the vehicle's acceleration speed larger than the predetermined value $C_1$, then the results of the determining processes (30), (31) and (32) are all "Yes." Thus, after a data reading process (34) is completed, a low speed range specifying process (35) for obtaining a lower speed range is carried out. In process (35), the electronic control device 112 applies signals to the solenoid valves 108 and 110 so that a lower speed range such as the third or second speed range is provided according to the speed or acceleration of the vehicle at that time. Thereafter, a process (36) for determining whether or not the engine speed is 0 r.p.m., a process (37) for determining whether or not the vehicle speed is 0 km/h, a process (38) for determining whether or not the low speed switch 158 is turned on (in this case, the low speed switch 148 is in the "off" state and "No" is provided as a result of this process because the process is effected after the process loop C), and a process (39) for determining whether or not the throttle valve is fully closed are carried out. As long as the engine is maintained running, the vehicle continues traveling and the throttle valve is fully closed, the processes (34), (35), (36), (37), (38) and (39) (hereinafter referred to as process loop E) are performed. Thus, even after the foot brake is released, the above provided second or third (downshifted) speed range is maintained, so that an engine braking action is provided.

When, during the execution of process loop E, the vehicle is stopped or the throttle valve is again opened, a "Yes" is provided as the result of process (37) or a "No" is provided as the result of process (39), so that process loop C or C' is then effected. An input element to the electronic control device 112, namely, a cancel switch 400 for preventing the downshift to a lower range may be provided as indicated by the broken line in FIG. 3. In addition to the processes (30), (31) and (32) in this case, a cancel switch status determining process (40) for determining whether or not the cancel switch 400 is turned on, as indicated by the broken line in FIG. 5, is carried out in shifting to process loop E from process loop C. When "Yes" is provided as a result of the process (40) (i.e., when the cancel switch 400 is turned on), process loop E is not effected, and accordingly the downshift is not executed.

During the execution of process loop C or C', if the operator turns on the low speed switch 158, a "Yes" is provided from determining process (28). Therefore, the data reading process (34) and the low speed range specifying process (35) are performed. In addition, determining processes (36) through (38) are carried out. The processes (34) through (38) (hereinafter referred to as process loop E') are then repeatedly carried out in normal running, until the low speed switch 158 is turned off. Accordingly, the electronic control device 112 applies to the solenoid valve 108 and 110 signals for providing a low speed range in response to an electrical signal from the low speed range in response to an electrical signal from the low speed switch 158, or signals for achieving an automatic shift between the low speed range and a lower speed range. Accordingly, the engine braking action can be achieved as required by the operator, or quick acceleration can be conducted while holding the low speed range. In the process loop E', when the vehicle is stopped, a "Yes" is provided from process (37). Therefore, the data reading process (18) is effected, and processes (19) through (21) and (24) through (28) are performed. "Yes" is still provided as the result of process (28), so process loop E' is again carried out. Therefore, when the vehicle is stopped, processes (37), (18), (19), (20), (21), (24), (25), (26), (27), (28), (34), (35), (36) and (37) are repeated. Thereafter, when the vehicle is running, process loop E' is repeated. In addition to the indicating switching, a low speed switch 158 may be provided so that the second speed range, which is extensively employed as a low speed range, may be fixedly provided according to an electrical signal from this low speed switch. Alternatively, in the case of speed change gearing which, as in the present embodiment, includes four forward speed ranges, three low speed switches 158 may be provided in such a manner as to produce a signal for fixedly providing the first speed range, a signal for achieving automatic shifting between the first and second speed ranges, and a signal for achieving automatic shifting between the first, second and third speed ranges, respectively.

When the operator turns on the indicating switch 138 (i.e., when reverse travel is instructed) when the vehicle is stopped and process loop C' is being repeated, the results of the determining processes (26) and (33) are "Yes." Therefore, a data reading process (41), a process for setting the operating condition change-over valve 88 to the position R, and a process (43) for sounding a buzzer or the like (optional) are performed. In succession, a process (44) for determining whether or not the engine is stopped, and an indicating switch status determining process (45) are conducted. As long as indicating switch 138 is in the "on" state, processes (41), (42), (43), (44) and (45) (hereinafter referred to as process loop F) are repeated, and the reverse range is effected in the speed change gearing assembly. If the indicating switch 138 is turned off when the vehicle is moving backwardly while process loop F is being repeated, the reverse range is maintained, because a "No" is provided from process (46) in determining whether or not the vehicle speed is 0 km/h, and the data reading process (41) is again effected. When the vehicle speed reaches 0 km/h, an alarm stopping process (47) is performed. The process loop C' is then effected, the operating condition change-over valve 88 is set to the position D, and the forward speed range is obtained. Accordingly, even if the indicating switch 138 is turned off by mistake while the vehicle is running in reverse, the reverse range is maintained. Accordingly, the danger that a forward speed range may be provided before the vehicle is stopped is eliminated, which again contributes to the operational security of the vehicle.

When, in process loop F, a "Yes" is provided from the engine stop determining process (44), or if the engine is stopped, the alarm stopping process (47) is effected, and after processes (18), (19) and (20), or processes (18), (19), (20), (21) and (24) have been achieved, a "Yes" is provided at process (25). Therefore, a process (48) for automatically turning off the indicating switch 138 is carried out, and a process (49) for setting the operating condition change-over switch 88 to N position is performed, to provide the conditions for again starting the engine. Also in the other process loops B, C, C', E and E', when the results of engine stop determining processes (22), (25) and (36) thereof are "Yes," the above-described processes (48) and (49) are effected. After processes (48) and (49) are achieved, a data reading process (50) is carried out, and a process (51) for determining whether the keys switch is turned on or turned off, i.e., for determining whether or not engine stop was caused by the operator turning off the key switch, is performed. When a "Yes" output is provided from determining process (51), a process (52) for determining whether or not the speed of the engine is larger than a predetermined value $a_1$ (600 r.p.m. for instance) is conducted; and when not, the data reading process (50) is again effected, and processes (50), (51) and (52) are repeated. During this period, the operator may start the engine again with the key switch set to the starter position. When the speed of the engine is larger than the predetermined value $a_1$ for a predetermined period of time (two seconds for instance), a "Yes" is provided at process (52), and therefore a process (53) for determining whether or not the next speed of the engine is smaller than a predetermined value $a_2$ (1,500 to 2,500 r.p.m. for instance) is conducted. When a "No" is provided at process (53), the data reading process (50) is again effected; and when a "Yes" is provided, a process (54) for setting the operating condition change-over valve 88 to the position D is performed, and thereafter process loop C or C' is carried out.

When the result of the key switch on status determining process (51) is "No," a process (55) for determining whether or not the vehicle speed is 0 km/h is carried out. After it is confirmed that the vehicle is stopped, the process (15) for parking the vehicle is carried out, and the program ending process (16) is performed.

In the case where the engine stopped while the vehicle was running rearwardly, it is dangerous to allow the vehicle to start backward movement immediately after the engine is again started. In order to avoid this danger, the indicating switch status determining process (48) and the process (54) for setting the operating condition change-over valve 88 to the position D are carried out. That is, by the processes (48) and (50), the vehicle is shifted into a forward range initially, for security.

When the engine stops while the vehicle is moving forwardly, and the operator starts the engine again while the vehicle is still moving due to inertia, the engine may stop again if a speed change is achieved while the rotation of the engine is unstable; and so-called "speed change shock" is caused if speed change is achieved while the speed of the engine is high. In order to avoid these difficulties and thereby achieve smooth speed changing, the engine speed determining processes (52) and (53) are performed.

The foregoing embodiment of the invention, operating according to the above-described control process and using an oil pressure control system and an electronic control device, has the following merits:

(a) The parking mechanism 59 is not released before the engine is operated, the operator sits on the driver's seat and closes the door and the parking brake is operated. Accordingly, the vehicle may not be run unintentionally immediately after the engine is started, and the parking mechanism 59 will not be released to allow the vehicle to run by inertia. Thus, the invention provides high security.

(b) when it is confirmed that the key switch is turned off and the vehicle is stopped, or when it is confirmed that the operator has left the vehicle without operating the parking brake, the parking mechanism 59 is engaged. Accordingly, the vehicle cannot be caused to run without the operator.

(c) The ordinary running conditions, including the application of the engine brake when the vehicle runs down a slope, can be obtained merely by the on-off operation of the indicating switch 138 controlled by the operator. Accordingly, with the present automatic speed change gear assembly, unlike the conventional one, an intricate lever operation and assembly is eliminated, the driving operation is simplified, operability and security are improved, and erroneous operations rarely occur. Even when, while the vehicle is running, the indicating switch 138 is erroneously operated to indicate the opposite direction, the speed range then specified by the indicating switch 138 is not obtained, i.e., a neutral state is achieved or the speed range in the direction of vehicle running is obtained. Thus, the invention prevents damage to the vehicle.

(d) When the engine stops while the vehicle is running or is stopped, the operating condition change-over valve 88 is set to the N position if the key switch is not in the "off" state, and accordingly the gearing assembly is placed in the neutral state so that the engine can be started again. Accordingly, the speed change gear assembly is free from the troublesome operation of the conventional speed change gear assembly in which the operating lever must be set to the N or P position before the engine can be again started. That is, with the speed change gear assembly of the invention, immediately after the engine stops, the engine can be again started with the key switch set to the starter position. Thus, operation is considerably simplified.

(e) When the parking brake is operated with the vehicle stopped with the engine operating, the operating condition change-over valve 88 is set to the N position and the speed change gearing assembly is placed in neutral. Therefore, when it is required to stop the vehicle in response to a traffic signal, the vehicle can be stopped by merely operating the side brake lever, which is effective in preventing creep and can prevent application of an excessive load to the torque converter or the like.

(f) When the key switch is turned off, i.e., when the engine is stopped with the vehicle stopped, the parking mechanism 59 is automatically engaged. Accordingly, with the assembly of the invention, unlike the conventional apparatus, the danger of the operator leaving the vehicle without engaging the parking mechanism and the vehicle running unintentionally can be positively eliminated.

As is apparent from the above description, according to the invention, in the present automatic speed change gearing assembly, the means for applying instructions from the operator to the automatic speed change assembly consists solely of the indicating switch for indicating the direction of advancement. Thus, the provision of a conventional operating lever for switching oil pressure circuits is unnecessary. Accordingly, a larger and unimpaired space can be provided for the operator, and vehicle operability and security are improved, while erroneous operations can be prevented. Furthermore, as the lever operation is eliminated, the driving operation is simplified by as much.

In addition, in parking the vehicle, with the present automatic speed change gear assembly, vehicle stoppage and key switch turn-off are detected, whereby the parking mechanism is automatically operated and the vehicle is maintained parked. Accordingly, troublesome operations for operating the parking mechanism are eliminated, and the danger that the vehicle may run unintentionally because the operator has forgotten to perform some operation is prevented. That is, operability and security are improved.

In the above-described embodiment, a low speed switch 158 which provides a signal for fixedly holding a particular low speed range irrespective of the operating conditions is employed. However, the switch 158 may be eliminated as the case may be, because it is required only when the operator wants to determine the speed range independently. In this case, the determining processes (28) and (38) can be eliminated from the flow chart of FIG. 5, when is then modified such that the process (29) is effected after process (27), and such that when the result of process (37) is "No," the process (39) is effected.

In the above-described embodiment, the advancement direction indicating switch 138 is a conventional push-lock type switch. Instead of this switch, a restoration type normally open switch may be employed which has two closed positions to which the armature is tripped by the operating section, and one open position between the two closed positions. When the armature is tripped to one closed position, forward movement is indicated; and when it is tripped to the other closed position, backward movement is indicated. When the operating section is operated, the armature is tripped to one of the two closed position, but normally the armature is set at the open position. In this case, when forward movement or backward movement is indicated by the normally open switch, this indication is held in the electronic control device 112 until movement in the opposite direction is indicated. In the determining process (11) in FIG. 5, instead of determining whether or not the side switch 144 is turned on, a determination as to whether or not indication is provided by the normally open switch (or whether the normally open switch indicates forward movement or backward movement, discrimination between forward and backward movements not being necessary) is employed. In determining processes (26) and (45), it is determined whether the indication of the normally open switch (which is held in the electronic control device 112) is for backward movement or forward movement. In succession, in process (48), the indication of the normally open switch, which is held in the electronic control deivce 112, is forcibly set for forward movement.

In the above-described embodiment, the technical concept of the invention is applied to an automatic speed change gear assembly in which the forward, backward and neutral operating conditions can be obtained by merely operating the indicating switch 138; however, it should be noted that the automatic parking mechanism of the invention is not limited thereto or thereby. That is, the technical concept of the invention may be applicable to an automatic speed change gear assembly in which the abovedescribed operating conditions are obtained by operating an operating lever similarly as in the prior art. In this case, the parking mechanism 59 with the acutator 56 is provided, the position P of the operating lever is eliminated, and only the parking mechanism 59 is automatically operated by the control device.

What is claimed is:

1. An automatic speed change gear assembly for a vehicle, comprising:
   advancement direction indicating switch means having at least two settings, said switch means being manually operable to indicate forward movement at one of said two settings and backward movement at another setting;
   a vehicle stop sensor for detecting when said vehicle is stopped;
   operating condition change-over means for providing one of forward, backward and neutral operating conditions in response to forward, backward and neutral control signals, respectively; and
   control means responsive to said advancement direction indicating switch and said vehicle stop sensor for providing said neutral control signal when said advancement direction indicating switch means is switched from a forward movement indication to a backward movement indication and said vehicle stop sensor indicates that said vehicle is not stopped, and thereafter for automatically providing said backward control signal when said vehicle stop sensor indicates that said vehicle has stopped.

2. An assembly as claimed in claim 1, wherein said operating condition change-over device comprises means for switching oil paths for the supply of oil pressure from an oil pressure source to selected one of a plurality of frictional engagement devices, to provide one of said forward, backward and neutral operating conditions.

3. An automatic speed change gear assembly for a vehicle, comprising:
   advancement direction indicating switch means having at least two settings, said switch means being manually operable to indicate forward movement at one of said two settings and backward movement at another setting;
   a vehicle stop sensor for detecting when said vehicle is stopped;
   a parking brake operation sensor for detecting the operation of a manually operable parking brake device;
   operating condition change-over means for providing one of forward, backward and neutral operating conditions in response to forward, backward and neutral control signals, respectively, and
   control means responsive to said advancement direction indicating switch means, said vehicle stop sensor and said parking brake operation sensor for providing said neutral control signal when said vehicle stop sensor indicates that said vehicle is stopped and said parking brake operation sensor indicates that said parking brake has been operated.

4. An assembly as claimed in claim 3, wherein in said operating condition change-over device comprises means for switching oil paths for the supply of oil pressure from an oil pressure source to selected ones of a plurality of frictional engagement devices, to provide one of said forward, backward and neutral operating conditions.

5. An automatic speed change gear assembly for a vehicle, comprising:
   advancement direction indicating switch means having at least two settings, said switch means being manually operable to indicate forward movement at one of said two settings and backward movement at another setting;
   a vehicle stop sensor for detecting when said vehicle is stopped;
   an engine stop sensor for detecting the stopping of an engine of said vehicle;
   operating condition change-over means for providing one of forward, backward and neutral operating conditions in response to forward, backward and neutral control signals, respectively; and
   control means responsive to said advancement direction indicating switch means, said vehicle stop sensor and said engine stop sensor for providing said neutral control signal when said engine stop sensor indicates that said engine has stopped.

6. An assembly as claimed in claim 5, wherein, when the stoppage of said engine is detected by said signal from said engine stop sensor, said indicating switch means is automatically set to a forward movement indicating position.

7. An assembly as claimed in claim 5, including an engine speed sensor for detecting the speed of said engine, and means for obtaining a forward operating condition when re-starting said engine after the same has been stopped, when it is detected that a speed of said engine is maintained higher than a first predetermined value for a predetermined period of time and thereafter lower than a second predetermined value higher than said first predetermined value.

8. An assembly as claimed in claim 5, wherein in said operating condition change-over device comprises means for switching oil paths for the supply of oil pressure from an oil pressure source to selected ones of a plurality of frictional engagement devices, to provide one of said forward, backward and neutral operating conditions.

9. An automatic speed change gear assembly for a vehicle, comprising:
   a speed change gear mechanism capable of providing at least forward, backward and neutral ranges and having an output means, and including a parking mechanism for stopping the rotation of said output means to thereby place said vehicle in a parked state;

actuating means for operating said parking mechanism;

a vehicle stop sensor for detecting the stoppage of said vehicle;

a key switch for controlling the start and stop of an engine;

a seat switch for detecting when an operator sits on a driver's seat of said vehicle;

a parking brake operation sensor for detecting the operation of a manually operable parking brake device; and control means for applying signals to said actuating means to engage or disengage said parking mechanism according to signals from said vehicle stop sensor, seat switch, key switch and parking brake operation sensor, said control means applying a signal to said actuating means to place said parking mechanism in an engagement state when said vehicle stop sensor indicates that said vehicle is stopped, said parking brake operation sensor indicates that said parking brake has not been operated and said seat switch indicates that said driver's seat is not occupied.

10. An assembly as claimed in claim 9, further including release switch means for producing a signal for releasing said parking mechanism, said signal being given priority over said signals from said vehicle stop sensor and said key switch.

11. An automatic speed change gear assembly for a vehicle, comprising:

a speed change gear mechanism capable of providing at least forward, backward and neutral ranges and having an output means, and including a parking mechanism for stopping the rotation of said output means to thereby place said vehicle in a parked state;

actuating means for operating said parking mechanism;

a vehicle stop sensor for detecting the stoppage of said vehicle;

a key switch for controlling the start and stop of an engine;

a seat switch for detecting when an operator sits on a drivers seat of said vehicle;

a sensor for detecting the operation of said engine;

a parking brake operation sensor for detecting the operation of a manually operable parking brake device; and control means for applying signals to said actuating means to engage or disengage said parking mechanism in accordance with signals from said vehicle stop sensor, said key switch, said seat switch, said engine sensor and said parking brake operation sensor, said control means applying a signal to said actuating means to place said parking mechanism in an engagement state when said vehicle stop sensor indicates that said vehicle is stopped and said key switch is in an "off" position, and said control means operating to provide a signal to release said parking mechanism when said seat switch indicates that an operator is sitting on said drivers seat, said engine sensor indicates that said engine is being operated and said parking brake operation sensor indicates that said parking brake has been operated.

* * * * *